United States Patent [19]

Holmes et al.

[11] Patent Number: 4,965,017
[45] Date of Patent: Oct. 23, 1990

[54] LIQUID CRYSTAL DEVICES

[75] Inventors: Paul Holmes, Bulkeley; Alan Nevin, Warrington, both of England; Hermann Amstutz, Mellingen; Jurgen Nehring, Wettingen, both of Switzerland

[73] Assignees: Imperial Chemical Industries PLC, London, England; BBC Brown Boveri Ltd., Baden-Dattwil, Switzerland

[21] Appl. No.: 218,151

[22] Filed: Jul. 13, 1988

[30] Foreign Application Priority Data

Jul. 13, 1987 [GB] United Kingdom ................ 8716469

[51] Int. Cl.⁵ .......................... C09K 19/56; G02F 1/13
[52] U.S. Cl. ................................. 252/299.4; 350/330; 350/347 V; 428/910; 428/521
[58] Field of Search ...................... 252/299.4; 350/330, 350/347 V; 428/910, 521

[56] References Cited

FOREIGN PATENT DOCUMENTS 0177271  4/1986  European Pat. Off. .
0299664  1/1989  European Pat. Off. ......... 252/299.4
56-146120 11/1981 Japan .
57-097519  6/1982  Japan .

OTHER PUBLICATIONS

Nehring et al, High-Pretilt Polyphenylene Layers for Liquid-Crystal Displays, Appl. Phys. Lett 51 (16), Oct. 19, 1987, pp. 1283-1284.
Patent Abstracts of Japan, P Field, vol. 12, No. 192, Jun. 4, 1988, p. 41, P 712, #62-297818.

*Primary Examiner*—John S. Maples
*Assistant Examiner*—Richard Treanor
*Attorney, Agent, or Firm*—Cushman, Darby & Cushman

[57] ABSTRACT

An alignment layer for a liquid crystal display consists at least substantially of a polyphenylene polymer wherein at least 80% of the said polyphenylene polymer is composed of aromatic phenylene rings. The alignment layer is capable of providing a homogeneous alignment of liquid crystal molecules disposed adjacent thereto with a high tilt bias angle.

19 Claims, 2 Drawing Sheets

LIQUID CRYSTAL DEVICES

The present invention relates to liquid crystal displays, particularly to alignment layers for such displays, and to the preparation thereof.

The structure of liquid crystal displays and the use of an alignment layer to orientate the liquid crystal therein are well known (see, for example, the section "Digital Displays" at page 724 et seq in "Encyclopaedia of Chemical Technology" 3rd Edition Kirk Othmer).

In conventional liquid crystal displays the liquid crystal is often interposed between two alignment layers. These alignment layers are typically supported on transparent electrode layers which in turn are supported on transparent, for example, glass, support plates, i.e. the electrode layer is interposed between the aforesaid alignment layer and the support plate.

It will be appreciated that a liquid crystal display may include one or more further components, for example, a barrier layer, an internal reflecting layer, or a polarising layer.

Twisted nematic liquid crystal displays in which the orientations of the liquid crystal molecules within the display cell undergo a 90° twist from a first alignment layer to a second alignment layer are known.

It is believed that the surface of the alignment layer in contact with the liquid crystal promotes a substantially unidirectional alignment of the liquid crystal molecules located at the aforesaid surface. This unidirectional alignment of the liquid crystal molecules at the alignment layer surface is such that they align at an angle, the so-called "tilt bias angle", with respect to the surface of the alignment layer. By a substantially unidirectional alignment we are intending to denote an arrangement in which the molecular axes of the liquid crystal molecules all align in the same general direction, but are not, necessarily, exactly parallel to each other.

Alignment layers are also known in the art as "orientation layers" and, furthermore, tilt bias angles are also referred to as "pretilt angles" or "tilt angles". However, they will hereinafter be referred to, for convenience, as alignment layers and tilt bias angles respectively.

It is known that the alignment of liquid crystal molecules may be effected by various alignment techniques. For example, this is often achieved by using a polyimide alignment layer which has been unidirectionally rubbed with a soft cloth. The resultant alignment layer provides a molecular alignment of the liquid crystal molecules along the rubbing direction and a tilt bias angle of between 0.5° and 2°. Such alignment layers are suitably employed in 90° twisted nematic displays.

As problems associated with conventional liquid crystal displays of the 90° twisted nematic variety may be mentioned, inter alia, limited contrast ratio and narrow viewing angle when multiplexed. These problems have led to the development of 180° to 360° twisted nematic liquid crystal displays, hereinafter referred to, for convenience, as "supertwisted liquid crystal displays". These have a superior image quality, for example, higher contrast and wider viewing angle at high multiplexing rates, over conventional, i.e. non-supertwisted, twisted nematic displays.

One such supertwisted display is described in the second applicants U.S. Pat. No. 4,634,229, the disclosure in which is incorporated herein by way of reference. This specification discloses a supertwisted liquid crystal display in which the total twist angle of the liquid crystal within the display cell is preferably about three times larger (i.e. about 270°) than the total twist angle in a 90° twisted nematic display. However, the development of these supertwisted liquid crystal displays has often required the use of alignment layers that will align the liquid crystal molecules adjacent thereto with much larger tilt bias angles than required hitherto. A tilt bias angle of at least greater than 5° may be required, for example, greater than 10°. It is taught, for example, in the aforementioned U.S. Pat. No. 4,634,229 that the supertwisted liquid crystal display disclosed therein depends, for its operation, upon an alignment layer that is capable of providing a tilt bias angle of greater than 5°, preferably between 10° and 40°.

The hereinbefore described rubbed polyimide alignment layers which are conventionally employed in 90° twisted nematic displays give tilt bias angles typically of about 0.5° to 2°. Such angles tend to be too small for use in supertwisted nematic displays. It is known in the art that higher tilt bias angles can be obtained by alternative, often more expensive, techniques. For example, an alignment layer formed by oblique evaporation of silicon monoxide under high vacuum has often been preferred. This technique produces a zig zag layer of silicon monoxide which is capable of providing the required high tilt bias angle. However, the production of this silicon monoxide alignment layer cannot be easily incorporated into a production line for liquid crystal displays. Furthermore, the use of a silicon monoxide alignment layer tends to limit the size of display that can be manufactured and increases the cost thereof.

Accordingly, it would be advantageous to develop an alignment layer which is capable of providing high tilt bias angles at low cost. It would be particularly advantageous if the method used to prepare such an alignment layer could be at least about comparable in simplicity and reliability to the methods conventionally used to prepare rubbed polyimide alignment layers (which provide only low tilt bias angles), so that the production of the said alignment layer could be readily incorporated into a production line for manufacturing liquid crystal displays.

In the first applicants pending European Patent Application No. 177271, the disclosure in which is incorporated herein by way of reference, there is disclosed the use of polyphenylene polymers as alignment layers. It is disclosed therein that an alignment layer comprising a polyphenylene polymer, after appropriate rubbing, can be used to provide a tilt bias angle in the range 5° to 15°, more usually between 7° and 12°, and especially between 9° and 11°.

In the aforesaid European Patent Application there is further disclosed a process for the preparation of an alignment layer comprising a polyphenylene polymer, which process comprises the steps of depositing a layer of a certain polycyclohexadiene onto a transparent electrode and then converting said polycyclohexadiene layer into the said alignment layer. The preparation of alignment layers by this process affords distinct advantages over the preparation of alignment layers by the oblique evaporation of silicon monoxide.

We have now developed an alignment layer, and a method of preparation thereof, which is capable of providing a homogeneous alignment of liquid crystal molecules disposed adjacent thereto with a high tilt bias angle. For example, a homogeneous alignment of the liquid crystal molecules with a tilt bias angle of at least 10°, preferably at least 15°, for example, above 20° or even above 25° is attainable. The preparation of the said alignment layer is, in many circumstances, relatively simple compared with the preparation of alignment layers by the oblique evaporation of silicon monoxide and it is capable of being incorporated into a production line for the manufacture of liquid crystal displays.

A further advantage of polyphenylene as an alignment layer material is its relative transparency, particularly when prepared as described, in the critical visible range.

According to a first aspect of the present invention there is provided a liquid crystal alignment layer comprising a polyphenylene polymer supported upon a substrate characterised in that the said alignment layer consists at least substantially of said polyphenylene polymer and wherein at least 80% of the said polyphenylene polymer is composed of aromatic phenylene rings.

According to a second aspect of the present invention there is provided a method of preparing an alignment layer according to the first aspect of the invention which comprises forming the said alignment layer upon a substrate.

The alignment layer of the present invention consists at least substantially of a polyphenylene polymer by which we are intending to define an alignment layer which typically consists of at least 90% by weight, preferably at least 95% by weight, and particularly preferably 99% by weight of a polyphenylene polymer. In especially preferred embodiments, the alignment layer is entirely composed of a polyphenylene polymer.

The degree of aromaticity of the polyphenylene polymer in at least the region of the surface of the alignment layer for contacting a liquid crystal and preferably the whole of the alignment layer, is at least 80%, so that at least 80% of the said polyphenylene polymer in at least the region of the surface of the alignment layer, and preferably the whole of the alignment layer, is composed of aromatic phenylene rings. In more preferred embodiments, at least 90%, preferably at least 95%, and particularly preferably at least 98% of the polyphenylene polymer in at least the said surface region of the alignment layer, and preferably the whole of the alignment layer, is composed of aromatic phenylene rings. In especially preferred embodiments 100% of the polyphenylene polymer in at least the region of the surface of the alignment layer, and preferably the whole of the alignment layer, is composed of aromatic phenylene rings.

Accordingly, a preferred aspect of the present invention provides an alignment layer which is entirely composed of a polyphenylene polymer which is entirely composed of aromatic phenylene rings in at least the region of the surface of the alignment layer for contacting a liquid crystal and preferably the whole of the alignment layer.

The alignment layer of the present invention will hereinafter be referred to, by way of convenience, as a polyphenylene alignment layer.

The polyphenylene alignment layer is appropriately and preferably prepared from a poly(1,2-disubstituted-cyclohexa-3,5-diene) which is deposited as a layer on a substrate and then subjected to suitable curing conditions so as to aromatise at least 80% of the 1,2-disubstituted-cyclohex-4-enylene rings of the poly(1,2-disubstituted-cyclohexa-3,5-diene) to phenylene rings. The resultant polyphenylene polymer layer is then fabricated by suitable techniques, for example, by rubbing the said layer, such that the polyphenylene alignment layer of the present invention is prepared. Examples of poly(1,2-disubstituted-cyclohexa-3,5-dienes) from which the polyphenylene alignment layers of the invention may be prepared are more fully described in the first applicants European Patent Specifications E.P. Nos. 76605 and 154162, the disclosures in which specifications are incorporated herein by way of reference.

The poly(1,2-disubstituted-cyclohexa-3,5-diene) which may be used used to form the polyphenylene alignment layer according to the process of the present invention is preferably a homo-polymer in which the two substituents on each cyclohex-4-enylene ring are identical.

We do not, of course, exclude the possibility of using copolymers of certain 1,2-disubstituted-cyclohexa-3,5-dienes, for example, a copolymer of 1,2-diacetoxy-cyclohexa-3,5-diene and 1,2-dimethylcarbonate-cyclohexa-3,5-diene.

In a preferred embodiment according to the present invention a poly(1,2-disubstituted-cyclohexa-3,5-diene), (hereinafter referred to, for convenience, as a "disubstituted polymer") is dissolved in a suitable solvent, and a layer of the disubstituted polymer is then deposited from the resultant solution on an appropriate substrate, preferably by a roller coating, spin coating or screen printing technique, although we do not exclude the possibility that other coating techniques may be used, including, typically those known and used in the electronics art.

Examples of solvents which may prove suitable for dissolving the disubstituted polymer so that the aforesaid polymer may be deposited as a layer therefrom by a suitable coating technique include acetone, chloroform, methylene chloride, 1,2-dichloroethane, butyl diglycol acetate, 2-methoxy ethanol, 2-ethoxy ethanol, 2-phenoxy ethanol or N-methyl-2-pyrrolidone. We do not, of course, exclude the possibility that alternative solvents, or admixtures of a plurality of solvents may prove to be suitable for dissolving the disubstituted polymer.

The concentration of the disubstituted polymer solution which may be employed is not normally critical, though preferably a solution concentration of between 2% and 35%, particularly preferably between 8% and 20% is employed, where the concentration expressed as a percentage is defined as follows:

Concentration (C) expressed as a percentage =

$$\frac{\text{Weight of poly(1,2-disubstituted-cyclohexa-3,5-diene)}}{\text{Weight of solvent used}} \times \frac{100}{1}$$

The thickness of the disubstituted polymer layer that is deposited will, of course, be determined, in part, by the concentration of the coating solution employed. The thickness of the polyphenylene alignment layer will be determined, inter alia, by the thickness of the disubstituted polymer layer that is deposited, as well as the nature of the substituents present in the disubstituted polymer.

The skilled man in the art will be able to ascertain by reasonable experiment that set of conditions which is most preferably employed for the deposition of a disubstituted polymer layer by a particular technique. It should be understood that a set of conditions that may prove preferable in relation to one coating technique will not necessarily be transferable to a different coating technique, for example, the choice of solvent(s) to dissolve the disubstituted polymer may well depend on which coating technique is employed.

A liquid crystal display typically comprises two mutually disposed, parallel aligned support plates which form a cell with inner surfaces and a border into which is placed a liquid crystal. Each of the said support plates is appropriately laminated with the components characteristic of display cells, typically comprising an electrode layer formed on one surface of each plate, on which electrode layer is formed an alignment layer. The laminated support plates are joined together so that the alignment layers thereof are innermost, with their inwardly facing surfaces and the border enclosing the said cell.

Therefore, according to one embodiment of the present invention a disubstituted polymer is formed as a layer over an electrode layer, so that the electrode layer will be interposed between the support plate and the newly formed disubstituted polymer layer. The disubstituted polymer layer is then aromatised to polyphenylene and then subjected to suitable fabrication techniques, hereinafter described in more detail, to yield the polyphenylene alignment layer of the invention. The hereinbefore described conformation for a liquid crystal display is not absolute, so that certain displays may further comprise an internal reflecting layer interposed between the electrode layer and the alignment layer, so that the disubstituted polymer layer and the polyphenylene alignment layer formed therefrom are formed upon an internal reflecting layer. Further components which may form part of a liquid crystal display include, inter alia, barrier layers, polarising layers and external reflecting layers.

Accordingly, the present invention further provides a liquid crystal display comprising:
(a) two mutually disposed, parallel aligned support plates which form a cell with inner surfaces and a border;
(b) a liquid crystal filled into the cell;
(c) each support plate having formed in sequence on the inner surface thereof at least an electrode layer and an alignment layer;
(d) wherein the alignment layer on at least one of the said support plates consists essentially of a polyphenylene polymer; and
(e) wherein at least 80% of the said polyphenylene polymer in at least the region of the surface of the alignment layer for contacting the liquid crystal is composed of aromatic phenylene rings.

The support plates are conveniently sodium silicate glass support plates covered with a layer of quartz glass on at least one surface thereof. It is believed that the quartz layer functions as a barrier layer preventing materials present in the sodium silicate glass which may deleteriously affect the tilt bias angle that the polyphenylene alignment layer is capable of providing from migrating through to the said polyphenylene alignment layer. Materials which may contaminate the alignment layer include, for example, inorganic ions such as sodium ions. We have found that sodium ions may have a particularly adverse affect on the functioning of the polyphenylene alignment layer in terms of its capability to provide a high tilt bias angle. In preferred embodiments the polyphenylene alignment layer has a sodium ion concentration therein of less than 1000 ppm, more preferably less than 500 ppm, and particularly preferably less than 200 ppm. Therefore, the quartz barrier may, by preventing the migration of sodium ions from the sodium silicate glass support plates, assist in moderating the sodium ion concentration in the alignment layer to an acceptable level.

The sodium silicate glass support plates may, of course, have formed thereon other barrier layer materials which prevent materials present in the glass plates from contaminating the polyphenylene alignment layer or any materials used in the formation thereof. For example, a suitable barrier layer may, as an alternative to quartz, be composed of boron silicate or alternatively, polyimide, a material which is conventionally used as a barrier layer in silicon chip devices.

The sodium silicate glass support plates may have a barrier layer material formed on only one surface thereof, which surface with its barrier layer thereon is a foundation on which to form at least an electrode layer and thereafter the polyphenylene alignment layer of the present invention.

Therefore, according to a further embodiment of the present invention, a liquid crystal display cell comprises (1) a sodium silicate glass support plate having formed sequentially on one surface thereof at least (2) a barrier layer, preferably of quartz glass, (3) an electrode layer, and (4) a polyphenylene alignment layer, which alignment layer is preferably formed by aromatisation and fabrication of a prior deposited disubstituted polymer layer.

We do not of course exclude the possibility that the barrier layer(s) may occupy other positions in the liquid crystal display cell, for example, as a layer in a position intermediate the electrode layer and the polyphenylene alignment layer. It should also be realised that we do not dismiss the possibility of utilising a support plate formed from other materials, particularly those materials that do not contain inorganic ions such as sodium ions, since such a support plate may make the inclusion of a barrier layer unnecessary, so that the electrode layer can then be formed directly onto the support plate. For example, a support plate composed of quartz and/or boron silicate, may be employed. Alternatively, support plates manufactured from polymeric materials, for example, polyethylene terephthalate support plates may be employed.

The electrode layer may often be formed as a continuous coating which substantially covers the area defined by the support plate. In contrast, such an electrode layer may often not form such a continuous layer in a fully assembled display cell. For example, the electrode layer may have the configuration of a plurality of parallel, or substantially parallel striations of electrode material disposed on the surface of a support plate or barrier layer where present. Such an electrode layer may be fabricated, for example, by first forming a continuous electrode layer by any conventional means, and then removing the unwanted electrode material, preferably by etching, for example, by a chemically induced process. With an indium-tin oxide electrode layer an acid compound may be suitably employed as an etching agent. It will be understood, therefore, that by an electrode layer we do not necessarily mean a continuous, uninterrupted layer of electrode material.

The combination of two support plates with layers formed thereon, as hereinbefore described, in which the electrode layer on one support plate comprises a plurality of parallel, or substantially parallel, striations of electrode material, which striations are orthogonally disposed to a corresponding plurality of striations on an adjacent support plate, forms the dot matrix network characteristic of some certain liquid crystal displays.

Where the electrode layer has the configuration of a plurality of parallel striations, an alignment layer formed over the surface of the electrode layer will not exclusively contact the electrode layer, but may also contact, for example, the support plate or the barrier layer where present, e.g. in the area where the electrode material has been removed. However, the variation in the nature of the substrate on which the polyphenylene alignment layer is formed does not normally substantially affect the functioning of the liquid crystal display.

In a particularly preferred embodiment according to the present invention the poly(1,2-disubstituted-cyclohexa-3,5-diene) which is used to form the polyphenylene alignment layer of the invention is a poly(1,2-di(hydrocarbylcarbonate)-cyclohexa-3,5-diene), hereinafter referred to, for convenience, as a "dicarbonate polymer", in which the hydrocarbylcarbonate substituents on each cyclohex-4-enylene ring are preferably alkylcarbonate substituents, particularly preferably alkylcarbonate substituents in which the alkyl group R has up to ten carbon atoms in the chain, and more particularly preferably the alkyl group is a methyl group.

For the avoidance of doubt, by a hydrocarbyl-carbonate substituent we mean a substituent which has the general formula ROCOO—, where R is a hydrocarbyl or a substituted hydrocarbyl group.

The solvent which is employed to dissolve the dicarbonate polymer, in order that the aforesaid polymer may be deposited from a solution therein so as to form a layer, is preferably N-methyl-2-pyrrolidone. Alternatively, admixtures of N-methyl-2-pyrrolidone with one or more alternative solvents may suitably be employed to dissolve the dicarbonate polymer. Suitable alternative solvents may be selected, for example, from acetone, chloroform, methylene chloride, 1,2-dichloroethane, butyl diglycol acetate, 2-methoxy ethanol, 2-ethoxy ethanol, or 2-phenoxy ethanol. The dicarbonate polymer layer is preferably formed by a spin coating or roller coating technique, and more preferably at a temperature of 20° C. to 35° C. and a relative humidity of 30% to 50%, although we do not exclude the possibility that a temperature or relative humidity outside these ranges may be used.

The dicarbonate polymer layer may typically be formed (i.e. coated) directly onto an electrode layer. It is particularly preferable to coat the dicarbonate polymer layer onto a transparent electrode layer of the type conventionally employed in liquid crystal displays, more particularly preferably the electrode layer is a crystalline tin oxide or indium-tin oxide electrode layer.

After the dicarbonate polymer layer has been formed, it may be aromatised to polyphenylene directly or, alternatively, it may be dried and then subsequently aromatised. The incorporation or omission of a drying step will not normally substantially affect the tilt bias angles provided by the polyphenylene alignment layer. Where a drying step is incorporated, it is often convenient to dry the dicarbonate polymer layer in a warm air oven for a period of about 20–30 minutes. The drying temperature and drying time will obviously vary depending on the solvent used. Typically, the drying temperature employed will be below the boiling point of the solvent.

The dicarbonate polymer layer can be aromatised by subjecting the layer to a suitable treatment, for example, in a temperature programmable furnace under vacuum or in an inert atmosphere, preferably of dry nitrogen. The oven temperature is conveniently raised at a preprogrammed rate to a pre-selected temperature above the glass transition temperature of the dicarbonate polymer. For example, a temperature of at least 200° C. is often employed, preferably a temperature of from 200° C. to 500° C., particularly preferably 300° C. to 450° C. and more particularly preferably 320° C. to 400° C. This final temperature is maintained for a suitable length of time to aromatise the dicarbonate polymer, typically at a temperature of about 400° C. this may be from between 5 and 60 minutes. However, where lower temperatures are employed, for example, below 400° C., longer periods of heating, for example, a few hours, may be necessary. Alternatively, the heating may be carried out under base catalysed conditions in which case lower temperatures may be employed to effect the aromatisation process. For example, a temperature of between 100° C. and 250° C. may be employed, for example, from between 150° C. to 200° C. After the heating has been completed the now polyphenylene layer is caused or allowed to cool to ambient temperature. The rate of this cooling process is not normally too critical providing it is not too rapid and so it is often preferable to allow the polyphenylene layer to cool within the furnace in which it was formed, while still maintaining the vacuum or inert atmosphere therein.

The dicarbonate derived polyphenylene polymer layer is converted into a polyphenylene alignment layer by suitable fabrication techniques, hereinafter discussed in more detail. The polyphenylene alignment layer is typically between 50 Å to 600 Å thick, preferably 100 Å to 500 Å thick and particularly preferably between 200 Å and 400 Å thick.

In an especially preferred embodiment according to the present invention, the poly(1,2-disubstituted-cyclohexa-3,5-diene) which is used to form the polyphenylene alignment layer of the invention is a poly(1,2-di(carboxylic ester)-cyclohexa- 3,5-diene). hereinafter referred to, for convenience, as a diester polymer, in which the carboxylic ester substituents on each cyclohex-4-enylene ring are preferably selected from the group of alkanoates or benzoates, particularly preferably alkanoates with up to ten carbon atoms in the alkyl group, and more particularly preferably the alkyl group is a methyl group.

For the avoidance of doubt, by a carboxylic ester substituent we mean a substituent which has the general formula $RCO_2^-$, where R is a hydrocarbyl or a substituted hydrocarbyl group.

The solvent which is employed to dissolve the diester polymer, in order that the aforesaid polymer may be deposited from a solution therein so as to form a layer, is preferably a 2-alkoxy ethanol, 2-phenoxy ethanol or N-methyl-2-pyrrolidone, particularly preferably the solvent is 2-phenoxy ethanol or N-methyl-2-pyrrolidone. It is to be understood that we do not exclude the possibility of using alternative solvents or admixtures of two or more solvents. Suitable alternative solvents may be selected, for example, from acetone, chloroform, methylene chloride. 1,2-dichloroethane or butyl diglycol acetate. The diester polymer layer is preferably formed by a spin coating, screen printing or roller coating technique, and more preferably at a temperature of 20° C. to 35° C. and a relative humidity of 30% to 50%, although we do not exclude the possibility that a temperature or relative humidity outside these ranges may be used.

The diester polymer layer may typically be coated directly onto an electrode layer, for example, onto a transparent electrode layer of the type conventionally employed in liquid crystal displays, such as a crystalline tin oxide or indium-tin oxide electrode layer.

For the avoidance of doubt, in this specification, by a crystalline tin oxide or indium-tin oxide electrode layer we mean an electrode layer which comprises a substantially oxidised and crystallised sample of tin oxide or indium-tin oxide.

After the diester polymer layer has been formed, it may be aromatised to polyphenylene directly or, alternatively, it may be dried and then subsequently aromatised. The incorporation or omission of a drying step will not normally substantially affect the tilt bias angles provided by the polyphenylene alignment layer. Where a drying step is incorporated, it is often convenient to dry the diester polymer layer in a warm air oven for a period of about 20–30 minutes. The drying temperature and the drying time will obviously vary depending on the solvent used. Typically, the drying temperature employed will be below the boiling point of the solvent.

The diester polymer layer can be aromatised by subjecting the layer to a suitable treatment, for example, in a temperature programmable furnace under vacuum or in an inert atmosphere, preferably of dry nitrogen. The oven temperature is conveniently raised at a pre-programmed rate to a pre-selected temperature above the glass transition temperature of the diester polymer. For example, a temperature of at least 200° C. is often employed, preferably a temperature of from 200° C. to 500° C., particularly preferably 350° C. to 450° C. and more particularly preferably 380° C. to 420° C. This final temperature is maintained for a suitable length of time to aromatise the diester polymer, typically at a temperature of about 400° C. this may be from between 5 and 60 minutes. However, where lower temperatures are employed, for example, below 400° C., longer periods of heating, for example, a few hours, may be necessary. After the heating has been completed the now polyphenylene layer is caused or allowed to cool to ambient temperature. The rate of this cooling process is not normally too critical providing it is not too rapid and so it is often preferable to allow the polyphenylene layer to cool within the furnace in which it was formed, while still maintaining the vacuum or inert atmosphere therein.

The diester derived polyphenylene polymer layer is converted by suitable fabrication techniques, hereinafter discussed in more detail, into a polyphenylene alignment layer. The polyphenylene alignment layer is typically between 100 Å to 10000 Å thick, preferably 200 Å to 8000 Å thick and particularly preferably between 500 Å and 1000 Å thick.

Accordingly, in an especially preferred embodiment of the invention a sodium silicate glass support plate has formed on one of its surfaces by a sequential layering technique, at least (1) a barrier layer, preferably of quartz glass, (2) a transparent electrode layer, preferably composed of crystalline tin oxide, or indium tin oxide, and (3) a diester or a dicarbonate polymer layer, which polymer layer is then aromatised, and fabricated to give the polyphenylene alignment layer of the present invention.

The choice of disubstituted polymer and the conditions which are employed to aromatise the disubstituted polymer to form the polyphenylene may prove critical if a polyphenylene alignment layer according to the invention is to result. For example, if too low a cure temperature is employed, or the cure time is insufficient, then the degree of aromatisation may not attain the required level, with the result that the alignment layer is unable to provide a homogeneous alignment of liquid crystal molecules at a high tilt bias angle.

Fabrication of the polyphenylene layers in order to form the polyphenylene alignment layers of the present invention may be by conventional and known techniques. For example, the polyphenylene layer may be unidirectionally rubbed using techniques well known in the electronics art, e.g. using rayon or cotton cloth. Further process steps typically involved in the manufacture of liquid crystal displays, such as selection of the liquid crystal, construction of the display cell, filling and sealing of the display cell, and provision of electronic control are typically conventional.

A display cell contains at least one polyphenylene alignment layer according to the present invention. If two such alignment layers are incorporated in the display cell they may be of substantially the same thickness although we do not exclude the possibility that they may be of different thickness.

The liquid crystal used in a liquid crystal display cell incorporating the alignment layer(s) of the present invention may in principle be any liquid crystal which is suitable for use in liquid crystal displays e.g. a nematic liquid crystal or a ferroelectric liquid crystal.

It will be appreciated that the polyphenylene alignment layers of the present invention may find application in any liquid crystal display technology in which a readily fabricated alignment layer of high tilt bias angle is required. For example, suitable applications for the polyphenylene alignment layer of the invention include, inter alia, supertwisted nematic liquid crystal displays and ferroelectric liquid crystal displays.

The present invention will now be illustrated with reference to the accompanying drawings.

Figure 1:
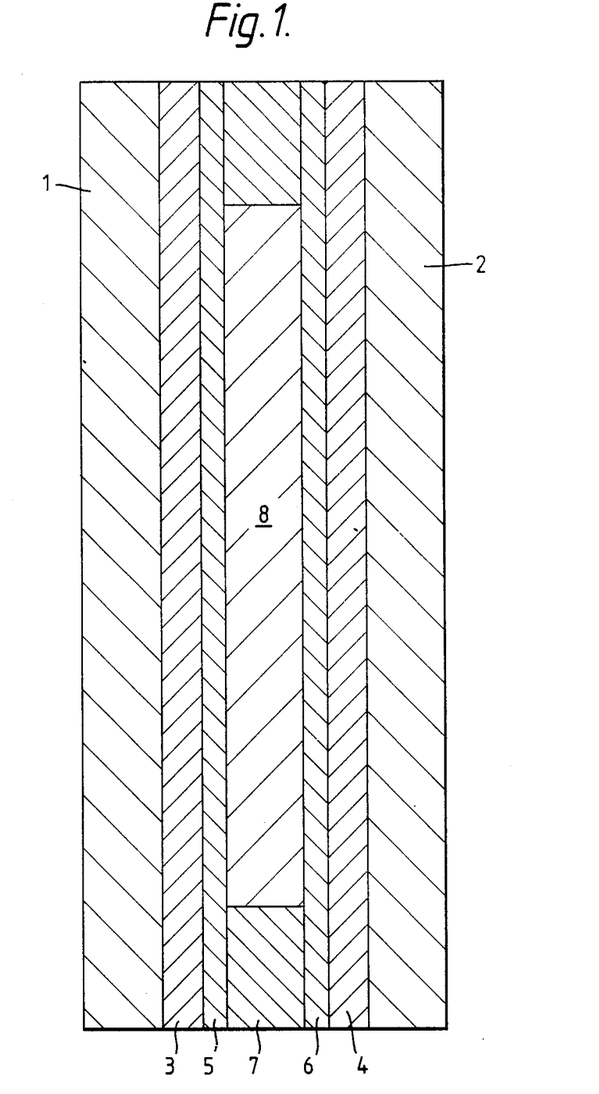
FIG. 1 shows a cell for a liquid crystal display incorporating an alignment layer according to the present invention.

In FIG. 1, two transparent support plates 1 and 2, covered wholly or partly on one surface by transparent electrode layers 3 and 4 of indium-tin oxide and then polyphenylene alignment layers 5 and 6 form, with a border 7, a cell which contains a liquid crystal composition 8.

In use, the electrode layers 3 and 4 are charged to appropriate potentials such that alignment of the liquid crystals in the cell is effected.

Figure 2:
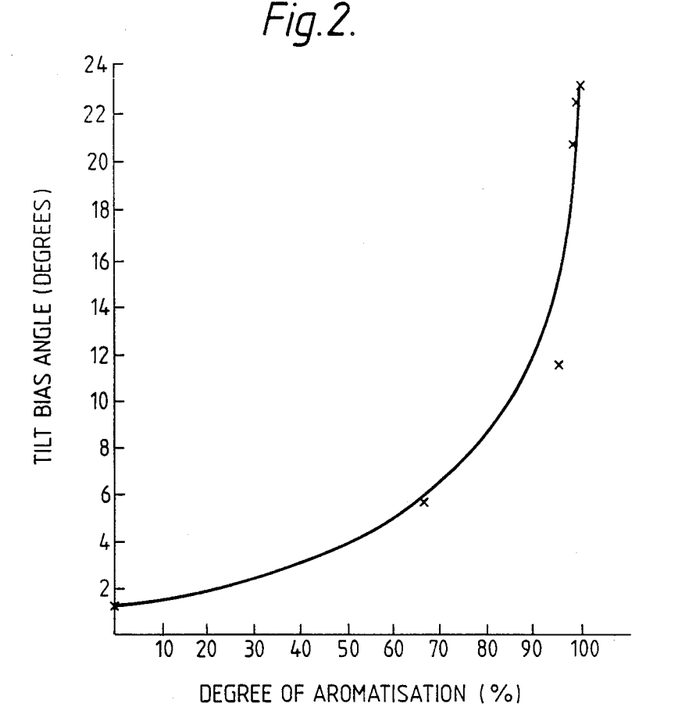
FIG. 2 is a graph with tilt bias angle plotted on the ordinate and degree of aromatisation as a percentage (corresponding to the percentage of 1,2-diacetoxy-cyclohex-4-enylene rings of a poly(1,2-diacetoxy-cyclohexa-3,5-diene) which have been aromatised to phenylene rings) plotted on the abscissa.

Referring now to FIG. 2, it can be seen that the measured tilt bias angle increases as the percentage of aromatisation is increased.

The invention is illustrated, but not limited, by the following examples.

Examples 1 to 30 are concerned with the use of polyphenylene alignment layers in twisted nematic liquid crystal displays.

EXAMPLES 1 to 4

Two sodium silicate glass support plates provided with a barrier layer of quartz glass on one surface of each, were employed as a rigid support on which to form the subsequent layers thereon by a sequential layering technique. The glass support plates each 50 mm×25 mm×1 mm were coated by conventional means on the quartz surface of each with a substrate (S) to form a layer thereon, washed in a clean air cabinet with pre-filtered chloroform (AR grade) and were then spun dried.

Poly(1,2-diacetoxy-cyclohexa-3,5-diene) was dissolved in N-methyl-2-pyrrolidone and filtered through 0.5 μm polytetrafluoroethylene membrane filters, such that a solution of the required concentration (C), suitable for spin coating, was produced. The concentration of the spin coating solution was determined using the formula below.

Concentration (C) expressed as a percentage =

$$\frac{\text{Weight of poly(1,2-diacetoxy-cyclohexa-3,5-diene)}}{\text{Weight of N-methyl-2-pyrrolidone}} \times \frac{100}{1}$$

Each of the support plates were covered on the substrate (S) side with an aliquot of the spin coating solution at least sufficient to cover the plate, and spun for an appropriate time in a Headway Research Inc Model 1-EC101D photo resist spinner, housed in a clean air cabinet, to obtain a uniform layer. The spin speed and spin time used in this coating process affected the thickness of the poly(1,2-diacetoxy-cyclohexa-3,5-diene) layer that was formed and subsequently, also, the thickness of the polyphenylene alignment layer, faster spin speeds and longer spin times tending to reduce their thickness.

The poly(1,2-diacetoxy-cyclohexa-3,5-diene) coated glass support plates were then transferred to an air circulated oven and dried for 30 minutes at 175° C. before cooling in a dessicator cabinet.

The drying stage was followed by aromatisation of the poly(1,2-diacetoxy-cyclohexa-3,5-diene) by heating the glass support plates coated with the aforesaid polymer in a nitrogen atmosphere, within a temperature programmable furnace, at a pre-programmed rate (R), to a preselected final temperature therein (T), and maintaining the furnace at this final temperature for a time (t), before cooling the now polyphenylene coated glass support plates to ambient temperature.

The polyphenylene polymer layer was then unidirectionally rubbed for a few seconds with a belt of synthetic velvet, and the two identically laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783–1792). The tilt bias angles obtained for the polyphenylene alignment layers are recorded in Table 1.

EXAMPLES 5 and 6

Two quartz glass covered sodium silicate glass support plates as described in Examples 1 to 4 were coated by conventional means on the quartz surface of each with an indium-tin oxide layer, washed in a clean air cabinet with pre-filtered chloroform (AR grade) and were then spun dried.

The indium-tin oxide layer was then removed from the surface of the quartz glass on which it was formed by an etching process, the poly(1,2-diacetoxy-cyclohexa-3,5-diene) layer then being formed by spin coating (see Examples 1 to 4) directly onto the re-exposed quartz. The remaining techniques, including those that were employed to fabricate the polyphenylene alignment layer and to measure the tilt bias angle that the aforesaid alignment layer provided conformed exactly to the techniques exemplified in Examples 1 to 4. The parameters used and the tilt bias angles obtained are illustrated in Table 2.

EXAMPLE 7

Two quartz covered sodium silicate glass support plates, as hereinbefore described with reference to Examples 1 to 4, were employed as a rigid support on which to form the subsequent layers thereon by a sequential layering technique. The glass support plates each 50 mm×25 mm×1 mm were coated by conventional means on the quartz surface of each with an indium-tin oxide layer, washed in a clean air cabinet with pre-filtered chloroform (AR grade) and were then spun dried.

Poly(1,2-dimethylcarbonate-cyclohexa-3,5-diene) was dissolved in N-methyl-2-pyrrolidone and filtered through 0.5 μm polytetrafluoroethylene membrane filters such that a 10% solution (w/w) of poly(1,2-dimethylcarbonate-cyclohexa-3,5-diene) in N-methyl-2-pyrrolidone, suitable for spin coating, was produced. Each of the support plates were covered on the indium-tin oxide side with an aliquot of the spin coating solution at least sufficient to cover the plate, and spun at 7,000 rpm for 2 minutes in a Headway Research Inc. Model 1-EC101D photo-resist spinner, housed in clean air cabinet, to obtain a uniform layer.

The spin-coated glass support plates were then transferred to an air circulated oven and dried for 30 minutes at 175° C. before cooling in a dessicator cabinet.

The poly(1,2-dimethylcarbonate-cyclohexa-3,5diene) polymer layer was then aromatised by heating the support plates coated with the aforesaid polymer in a nitrogen atmosphere at a rate of 7.5° C./min to 350° C. and maintaining this temperature for 5 minutes before being cooled to ambient temperature.

The polyphenylene polymer layer was then unidirectionally rubbed for a few seconds with a belt of synthetic velvet, and the two identically laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783–1792). A tilt bias angle of 15° for a polyphenylene alignment layer 500 Å thick was recorded.

EXAMPLES 8 and 9

Two quartz covered sodium silicate glass support plates, as hereinbefore described with reference to Examples 1 to 4, were employed as a rigid support on which to form the subsequent layers thereon by a sequential layering technique. The glass support plates each 46 mm×24 mm×1.5 mm were coated by conventional means on the quartz surface of each with an indium-tin oxide layer, washed in a clean air cabinet with pre-filtered chloroform (AR grade) and were then spun dried.

The indium-tin oxide layer was then completely removed from one half of the surface of the quartz glass on which it was formed by an etching process, so that only 50% of the total area of the glass support plate was coated with indium-tin oxide.

A 16% solution (w/w) of poly(1,2-diacetoxy-cyclohexa-3,5-diene) in 2-phenoxy-ethanol suitable for screen printing was then produced. The resultant solution was then used to coat each of the support plates on the indium-tin oxide/quartz side with a layer of poly(1,2-diacetoxy-cyclohexa-3,5-diene) by means of a silk screen process utilising a 200S mesh (i.e. 200 filaments/cm) screen.

The poly(1,2-diacetoxy-cyclohexa-3,5-diene) coated glass support plates were then transferred to an air circulated oven and dried for 10 minutes at 160° C. before cooling in a dessicator cabinet.

The drying stage was followed by aromatisation of the poly(1,2-diacetoxy-cyclohexa-3,5-diene) by heating the glass support plates coated with the aforesaid polymer in a nitrogen atmosphere at a rate of 10° C./min to a final temperature of 400° C. This final temperature was maintained for 1 minute, after which the now polyphenylene coated glass support plates were cooled within the nitrogen atmosphere of the furnace to a temperature of 100° C. within a 3 hour period, and then finally to ambient temperature.

The polyphenylene polymer layer was then unidirectionally rubbed for a few seconds with a belt of synthetic velvet at approximately 2.2 bar pressure, and the two identically laminated glass support plates with their polyphenylene alignment layers were incorporated into a liquid crystal display cell, the two aforesaid support plates being glued together so as to leave a 19 μm space between the alignment layer surfaces. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783-1792. The tilt bias angle was determined in the area where the polyphenylene alignment layer formed a layer over the indium-tin oxide electrode layer (see Example 8), and in the area where the indium-tin oxide layer had been removed (see Example 9). The tilt bias angles obtained for a 700 Å thick polyphenylene alignment layer are recorded in Table 3.

EXAMPLE 10

Two quartz glass support plates each 46 mm×24 mm×1.5 mm were employed as a rigid support on which to form the subsequent layers thereon.

A 32% solution (w/w) of poly(1,2-diacetoxy-cyclohexa-3,5-diene) in 2-phenoxy-ethanol suitable for screen printing was then produced. The resultant solution was then used to coat each of the support plates with a layer of poly(1,2-diacetoxy-cyclohexa-3,5-diene) by means of a silk screen process utilising a 90T mesh (i.e. 90 filaments/cm) screen.

The poly(1,2-diacetoxy-cyclohexa-3,5-diene) coated quartz support plates were then transferred to an air circulated oven and dried for 10 minutes at 160° C. before cooling in a dessicator cabinet.

The drying stage was followed by aromatisation of the poly(1,2-diacetoxy-cyclohexa-3,5-diene) by heating the quartz support plates coated with the aforesaid polymer in a nitrogen atmosphere at a rate of 10° C./min to a final temperature of 400° C. This final temperature was maintained for 1 minute, after which the now polyphenylene coated quartz support plates were cooled within the nitrogen atmosphere of the furnace to a temperature of 100° C. within a 3 hour period, and then finally to ambient temperature.

The polyphenylene polymer layer was then unidirectionally rubbed for a few seconds with a belt of synthetic velvet at approximately 2.2 bar pressure, and the two identically laminated quartz support plates with their polyphenylene alignment layers were incorporated into a liquid crystal display cell, the two aforesaid support plates being glued together so as to leave a 19 μm space between the alignment layer surfaces. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783-1792. A tilt bias angle of 18.2° for a polyphenylene alignment layer 8500 Å thick was recorded.

EXAMPLE 11

Two quartz covered sodium silicate glass support plates, as hereinbefore described with reference to Examples 1 to 4. were employed as a rigid support on which to form the subsequent layers thereon by a sequential layering technique. The glass support plates each 46 mm×24 mm×1.5 mm were coated by conventional means on the quartz surface of each with an indium-tin oxide layer, washed in a clean air cabinet with pre-filtered chloroform (AR grade) and were then spun dried.

A 32% solution (w/w) of poly(1,2-diacetoxy-cyclohexa-3,5-diene) in 2-phenoxy-ethanol suitable for screen printing was then produced. The resultant solution was then used to coat each of the support plates on the indium-tin oxide side with a layer of poly(1,2-diacetoxy-cyclohexa-3,5-diene) by means of a silk screen process utilising a 90T mesh (i.e. 90 filaments/cm) screen.

The poly(1,2-diacetoxy-cyclohexa-3,5-diene) coated glass support plates were then transferred to an air circulated oven and dried for 10 minutes at 160° C. before cooling in a dessicator cabinet.

The drying stage was followed by aromatisation of the poly(1,2-diacetoxy-cyclohexa-3,5-diene) by heating the glass support plates coated with the aforesaid polymer in a nitrogen atmosphere at a rate of 10° C./min to a final temperature of 400° C. This final temperature was maintained for 1 minute, after which the now polyphenylene coated glass support plates were cooled within the nitrogen atmosphere of the furnace to a temperature of 100° C. within a 3 hour period, and then finally to ambient temperature.

The polyphenylene polymer layer was then unidirectionally rubbed for a few seconds with a belt of synthetic velvet at approximately 2.2 bar pressure, and the two identically laminated glass support plates with their polyphenylene alignment layers were incorporated into a liquid crystal display cell, the two aforesaid support plates being glued together so as to leave a 19 μm space between the alignment layer surfaces. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783-1792. A tilt bias angle of 18.5° for a polyphenylene alignment layer 8500 Å thick was recorded.

EXAMPLE 12

Exactly the same method was used as for Example 10 except that sodium silicate glass support plates each 46 mm×24 mm×1.5 mm were employed instead of quartz glass support plates. A tilt bias angle of 11.5° for a polyphenylene alignment layer 8500 Å thick was recorded.

EXAMPLES 13 to 18

These examples investigate the affect of the degree of aromatisation on the measured tilt bias angle.

Two quartz covered sodium silicate glass support plates, as hereinbefore described with reference to Examples 1 to 4, were employed as a rigid support on which to form the following layers by a sequential layering technique. The glass support plates were coated by conventional techniques on the quartz surface of each with an indium-tin oxide electrode layer, washed in a clean air cabinet with pre-filtered chloroform (AR grade) and were then spun dried.

The indium-tin oxide layer was then removed by an etching process from one half of each support plate, thereby re-exposing the quartz on which it was formed, so that only 50% of the total area of each glass support plate was coated with indium-tin oxide.

On the indium-tin oxide/re-exposed quartz surface of one of the above support plates there was deposited, by a sputtering technique, a layer of gold approximately 300 Å thick. The incorporation of the gold layer on one of the above plates allowed for determination of the degree of aromatisation of the alignment layer that was subsequently formed thereon while remaining sufficiently transparent so that the tilt bias angle of the alignment layer could also be measured.

Poly(1,2-diacetoxy-cyclohexa-3,5-diene) was dissolved in N-methyl-2-pyrrolidone and filtered through 0.5 μm polytetrafluoroethylene membrane filters, such that a solution of a concentration suitable for spin coating was produced.

The support plate without the gold layer was covered on the indium-tin oxide/re-exposed quartz surface thereof with an aliquot of the spin coating solution at least sufficient to cover the plate, and spun in a Headway Research Inc. Model 1-EC101D photo-resist spinner, housed in a clean air cabinet, to obtain a uniform layer. The support plate provided with the gold layer was subjected to an identical coating process, except that the poly(1,2-diacetoxy-cyclohexa-3,5-diene) coating was formed on the gold layer which overlaid the indium-tin oxide/quartz surface.

The poly(1,2-diacetoxy-cyclohexa-3,5-diene) coated support plates were then transferred to an air circulated oven and dried at 175° C. for 30 minutes before cooling in a desiccator cabinet.

The drying stage was followed by heating the support plates coated with the poly(1,2-diacetoxy-cyclohexa-3,5-diene) polymer in a nitrogen atmosphere, within a temperature programmable furnace, at a pre-programmed rate (R), to a preselected final cure temperature therein (T). This final temperature was maintained for a cure time (t), after which the support plates were cooled within the nitrogen atmosphere of the furnace to ambient temperature. The final cure temperature and the cure time were adjusted so that for each of Examples 13 to 18 the degree of aromaticity of the polymer (i.e the percentage of 1,2-diacetoxy-cyclohex-4-enylene rings that had been aromatised to phenylene rings) was different.

The degree of aromatisation of the polymer on the support plate provided with the gold layer was determined by means of a specular reflectance technique using a Nicolet fourier transform infra-red spectrometer. The degree of aromatisation was calculated (as a percentage) by comparing the infra red spectra, specifically the intensity of the absorptions in the region of 810 cms$^{-1}$, corresponding to the para C-H bond of the phenylene ring, and 1750 cms$^{-1}$, corresponding to the C=O bond of the acetoxy group, using the formula below, where A(810) is the intensity of the absorption due to the para C-H bond and A(1750) is the intensity of the absorption due to the C=O bond.

$$\text{Degree of aromatisation (as a percentage)} = \frac{10 \times A(810)}{10 \times A(810) + A(1750)} \times 100$$

The factor of 10 which multiplies the intensity of the absorption due to the para C-H bond was to compensate for the difference in the extinction coefficients of the para C-H absorption and the C=O absorption. The absence of the C=O absorption at 1750 cms$^{-1}$ was deemed to indicate 100% aromatisation.

Each polymer layer was then unidirectionally rubbed for a few seconds with a belt of synthetic velvet, and the two laminated glass support plates with their alignment layers were incorporated into a liquid crystal display cell. The cavity (i.e. cell) between the two alignment layer surfaces was charged with the liquid crystal composition ZLI-2293 supplied by Merck.

The liquid crystal tilt bias angles were determined for both the alignment layers (i.e. the alignment layer formed over the gold layer (denoted as layer A in Table 4) and the alignment layer formed over the indium-tin oxide/quartz surface (denoted as layer B in Table 4)). using the magnetic null method of Scheffer and Nehring (J. Appl. Phys. (1977) 48, 1783-1792). Two tilt bias angle measurements were recorded for each alignment layer, one measurement being taken in the area of the support plate provided with the indium-tin oxide layer (this measurement being denoted as M1 in Table 4), and the other measurement in the area of the support plate where the indium-tin oxide layer had been removed (this measurement being denoted as M2 in Table 4). The tilt bias angles provided by the alignment layers as well as the degree of aromatisation of the said layers are all recorded in Table 4. The variation of the tilt bias angle with the degree of aromatisation for the alignment layers of Examples 13 to 18 formed over a gold layer are represented graphically in FIG. 2, with the degree of aromatisation (as a percentage) plotted on the abscissa and the measured tilt bias angle in the region of the support plate coated with the indium-tin oxide layer on the ordinate. It will be appreciated that the alignment layers of Examples 13 and 14 fall outside the scope of the present invention, while Examples 15 to 18 relate to alignment layers of the invention.

EXAMPLES 19 to 23

These examples illustrate the effect of the sodium ion concentration on the measured tilt bias angle.

Two quartz covered sodium silicate glass support plates, as hereinbefore described with reference to Examples 1 to 4, were employed as a rigid support on which to form the following layers by a sequential layering technique. The glass support plates were coated by conventional techniques on the quartz surface of each with an indium-tin oxide electrode layer, washed in a clean air cabinet with pre-filtered chloroform (AR grade) and were then spun dried.

The indium-tin oxide layer was then removed by an etching process from one half of each support plate, thereby re-exposing the quartz on which it was formed, so that only 50% of the total area of each glass support plate was coated with indium-tin oxide.

Poly(1,2-diacetoxy-cyclohexa-3,5-diene) was dissolved in N-methyl-2-pyrrolidone and filtered through 0.5 μm polytetrafluoroethylene membrane filters, such that a solution of a concentration suitable for spin coating was produced. To this solution was added a measured amount of a sodium salt (sodium chloride or sodium hydroxide) with the intention of deliberately contaminating the alignment layer. The exact sodium ion concentration of the solution was determined using atomic absorption spectroscopy, and this value was used to calculate the sodium ion concentration in the alignment layer allowing for the weight losses which occur during the processes used to prepare the alignment layer, assuming no sodium loss.

Each of the support plates were covered on the indium-tin oxide/quartz surface with an aliquot of the spin coating solution at least sufficient to cover the plate, and spun in a Headway Research Inc. Model 1-EC101D photo-resist spinner, housed in a clean air cabinet to obtain a uniform layer.

The poly(1,2-diacetoxy-cyclohexa-3,5-diene) coated support plates were then transferred to an air circulated oven and dried at 175° C. for 30 minutes before cooling in a desiccator cabinet.

The drying stage was followed by aromatisation of the poly(1,2-diacetoxy-cyclohexa-3,5-diene) by heating the glass support plates coated with the aforesaid polymer in a nitrogen atmosphere at a rate of 15° C./min to a final temperature of 400° C. This final temperature was maintained for 5 minutes, after which the now polyphenylene coated support plates were cooled within the nitrogen atmosphere of the furnace to ambient temperature.

Each polyphenylene polymer layer was then unidirectionally rubbed for a few seconds with a belt of synthetic velvet, and the two laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783–1792). The tilt bias angle was measured in the area where the polyphenylene alignment layer formed a layer over the indium-tin oxide electrode layer (this measurement being denoted as M1 in Table 5) and in the area of the support plate where the indium-tin oxide electrode layer had been removed (this measurement being denoted as M2 in Table 5). The tilt bias angles provided by the alignment layers and their dependence on the sodium ion concentration of the alignment layer are recorded in Table 5.

EXAMPLES 24 to 27

These examples investigate the use of different final cure temperatures and cure times.

Two quartz covered sodium silicate glass support plates, as hereinbefore described with reference to Examples 1 to 4, were employed as a rigid support on which to form the following layers by a sequential layering technique. The glass support plates were coated by conventional techniques on the quartz surface of each with an indium-tin oxide electrode layer, washed in a clean air cabinet with pre-filtered chloroform (AR grade) and were then spun dried.

Poly(1,2-diacetoxy-cyclohexa-3,5-diene) was dissolved in N-methyl-2-pyrrolidone and filtered through 0.5 μm polytetrafluoroethylene membrane filters, such that a solution of a concentration suitable for spin coating was produced.

Each of the support plates were covered on the indium-tin oxide with an aliquot of the spin coating solution at least sufficient to cover the plate, and spun in a Headway Research Inc. Model 1-EC101D photo-resist spinner, housed in a clean air cabinet to obtain a uniform layer.

The poly(1,2-diacetoxy-cyclohexa-3,5-diene) coated support plates were then transferred to an air circulated oven and dried at 175° C. for 30 minutes before cooling in a desiccator cabinet.

The drying stage was followed by aromatisation of the poly(1,2-diacetoxy-cyclohexa-3,5-diene) by heating the support plates coated with the aforesaid polymer in a nitrogen atmosphere, within a temperature programmable furnace, at a pre-programmed rate (R), to a preselected final cure temperature therein (T). This final temperature was maintained for a cure time (t), after which the now polyphenylene coated support plates were cooled within the nitrogen atmosphere of the furnace to ambient temperature.

Each polyphenylene polymer layer was then unidirectionally rubbed for a few seconds with a belt of synthetic velvet, and the two laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783–1792). The cure times and temperatures employed and the tilt bias angles provided by the polyphenylene alignment layers are illustrated in Table 6.

EXAMPLE 28

This example illustrates the use of poly(1,2-dibenzoyloxy-cyclohexa-3,5-diene).

Two quartz covered sodium silicate glass support plates, as hereinbefore described with reference to Examples 1 to 4, were employed as a rigid support on which to form the following layers by a sequential layering technique. The glass support plates were coated by conventional techniques on the quartz surface of each with an indium-tin oxide electrode layer, washed in a clean air cabinet with pre-filtered chloroform (AR grade) and were then spun dried.

The poly(1,2-dibenzoyloxy-cyclohexa-3,5-diene) was dissolved in 1,2-dichloroethane and filtered through 0.5 μm polytetrafluoroethylene membrane filters, such that a solution of a concentration suitable for spin coating was produced.

Each of the support plates were covered on the indium-tin oxide with an aliquot of the spin coating solution at least sufficient to cover the plate, and spun in a Headway Research Inc. Model 1-EC101D photo-resist spinner, housed in a clean air cabinet to obtain a uniform layer.

The poly(1,2-dibenzoyloxy-cyclohexa-3,5-diene) coated support plates were then transferred to an air circulated oven and dried for 15 minutes before cooling in a desiccator cabinet.

The drying stage was followed by aromatisation of the poly(1,2-dibenzoyloxy-cyclohexa-3,5-diene) to polyphenylene by heating the glass support plates coated with the aforesaid polymer in a nitrogen atmosphere within a temperature programmable furnace to a final temperature therein of 400° C. This final temperature was maintained for 10 minutes, after which the now polyphenylene coated support plates were cooled within the nitrogen atmosphere of the furnace to ambient temperature.

Each polyphenylene polymer layer was then unidirectionally rubbed for a few seconds with a belt of synthetic velvet, and the two laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783-1792). A tilt bias angle of 21.2° for a polyphenylene alignment layer 600 Å thick was recorded.

EXAMPLE 29

This example also illustrates the use of poly(1,2-dibenzoyloxy-cyclohexa-3,5-diene). Exactly the method was used as for Example 28 except that the indium-tin oxide electrode layer was removed so that the alignment layers were formed directly onto the quartz. A tilt bias angle of 15.1° for a polyphenylene alignment layer 700 Å thick was recorded.

EXAMPLE 30

This example illustrates the use of a copolymer of 1,2-diacetoxy-cyclohexa-3,5-diene and 1,2-dimethylcarbonate-cyclohexa-3,5-diene.

Two quartz covered sodium silicate glass support plates, as hereinbefore described with reference to Examples 1 to 4, were employed as a rigid support on which to form the following layers by a sequential layering technique. The glass support plates were coated by conventional techniques on the quartz surface of each with an indium-tin oxide electrode layer, washed in a clean air cabinet with pre-filtered chloroform (AR grade) and were then spun dried.

The indium-tin oxide layer was then removed by an etching process from one half of each support plate, thereby re-exposing the quartz on which it was formed, so that only 50% of the total area of each glass support plate was coated with indium-tin oxide.

The copolymer was dissolved in butyl diglycol acetate and filtered through 0.5 μm polytetrafluoroethylene membrane filters, such that a solution of a concentration suitable for spin coating was produced.

Each of the support plates were covered on their indium-tin oxide/quartz surface with an aliquot of the spin coating solution at least sufficient to cover the plate, and spun in a Headway Research Inc. Model 1-EC101D photo-resist spinner, housed in a clean air cabinet to obtain a uniform layer.

The copolymer coated support plates were then transferred to an air circulated oven and dried at 200° C. for 30 minutes before cooling in a dessicator cabinet.

The drying stage was followed by aromatisation of the copolymer to polyphenylene by heating the glass support plates coated with the copolymer in a nitrogen atmosphere within a temperature programmable furnace to a final temperature therein of 400° C. This final temperature was maintained for 5 minutes, after which the now polyphenylene coated support plates were cooled within the nitrogen atmosphere of the furnace to ambient temperature.

Each polyphenylene polymer layer was then unidirectionally rubbed for a few seconds with a belt of synthetic velvet, and the two laminated glass support plates with their polyphenylene alignment layers were incorporated into a liquid crystal display cell. The cavity (i.e. cell) between the two alignment layer surfaces was charged with the liquid crystal composition ZLI-2293 supplied by Merck, and determination of the liquid crystal tilt bias angle was effected using the magnetic null method of Scheffer and Nehring (J. Appl. Phys. (1977) 48, 1783-1792). A tilt bias angle of 16.5° was measured in the area of the support plate where the polyphenylene alignment layer formed a layer over the indium-tin oxide electrode layer, and a tilt bias angle of 17.6° was measured in the area of the support plate where the polyphenylene alignment layer formed a layer over the quartz (i.e. where the indium-tin oxide electrode layer had been removed). The thickness of the polyphenylene alignment layer was 250 Å.

EXAMPLES 31 and 32

These examples are concerned with the use of polyphenylene alignment layers in ferroelectric liquid crystal displays.

Two sodium silicate glass support plates with an etched electrode layer of indium-tin oxide on one surface of each were employed as a rigid support on which to form the polyphenylene alignment layer of the invention.

A 16% solution of poly(1,2-diacetoxy-cyclohexa-3,5-diene) in N-methyl-2-pyrrolidone suitable for spin coating was prepared. Each support plate was covered on the indium-tin oxide with an aliquot of the spin coating solution at least sufficient to cover the plate, and spun to obtain a uniform layer.

The poly(1,2-diacetoxy-cyclohexa-3,5-diene) coated support plates were then transferred to an air circulated oven and dried at 180° C. for 20 minutes to remove residual solvent.

The drying stage was followed by aromatisation of the poly(1,2-diacetoxy-cyclohexa-3,5-diene) by heating the glass support plates coated therewith in a nitrogen atmosphere within a temperature programmable furnace, gradually raising the temperature over a 30 minute period to a final temperature therein of 320° C. This final temperature was maintained for one hour, after which the now polyphenylene coated support plates were cooled thin withe nitrogen atmosphere of the furnace to ambient temperature.

Each polyphenylene polymer layer was then unidirectionally rubbed using velour, and the two laminated glass support plates with their polyphenylene alignment layers were incorporated into a display cell in which the spacing between the alignment layer surfaces varied from 2 μm to 16 μm (i.e. so called wedge cells). thus allowing optical bistability measurements to be carried out. In Example 31 the display cell was constructed so that the alignment layers were in a parallel configuration, while in Example 32 the display cell was constructed so that the alignment layers were in an anti-parallel configuration. The cavity (i.e. cell) between the two alignment layer surfaces was capillary filled at 123° C. with the ferroelectric liquid crystal SCE4 (supplied by BDH), the cell edges being sealed with an optical adhesive.

For both Examples 31 and 32 the ferroelectric liquid crystal spontaneously aligned on the polyphenylene alignment layer on cooling the liquid crystal from 90° C. to 80° C. at 1° C./min, with a tilt bias angle of 15° being recorded. The optical textures were better in the cell of Example 31 in which the alignment layers were in a parallel configuration.

To measure optical bistability, the cells were tested using a bipolar pulse of 20 V of 2 millisecond duration (mark space ratio 10:1). The cells were isolated electrically from the waveform and shorted to go to zero potential between the plates. The ability of the display to remain in the switched state when shorted (i.e. with no appreciable relaxation), was taken as an indication of optical bistability. Optical bistability was observed for the display cells of Examples 31 and 32 up to a separation of 10 μm between the alignment layer surfaces. Good contrast was observed for both the display cells and switching times were at least as fast as those achieved with polyimide or polyvinylalcohol alignment layers.

TABLE 1

| Example Number | (S) | (C) (% W/W) | Furnace Parameters | | | Polyphenylene Coating Thickness (Å) | Tilt Bias Angle (Degrees) |
| --- | --- | --- | --- | --- | --- | --- | --- |
| | | | Rate of Temp Increase (R) (°C./min) | Final Temp (T) (°C.) | Time Held at Final Temp (t) mins | | |
| 1 | Indium-tin Oxide | 15 | 15 | 400 | 5 | 400 | 20.8 |
| 2 | Indium-tin Oxide | 30 | 15 | 400 | 30 | 7000 | 20.0 |
| 3 | Gadolinium Oxide | 15 | 15 | 400 | 30 | 400 | 21.9 |
| 4 | Indium-tin Oxide | 15 | 15 | 400 | 30 | 400 | 20.9 |

TABLE 2

| Example Number | Concentration of Spin Coating Solution (C) (% W/W) | FURNACE PARAMETERS | | | Polyphenylene Coating Thickness (Å) | Tilt Bias Angle (Degrees) |
| --- | --- | --- | --- | --- | --- | --- |
| | | Rate of Temp Increase (R) (°C./min) | Final Temp (T) (°C.) | Time Held at Final Temp (t) mins | | |
| 5 | 15 | 15 | 400 | 5 | 400 | 20.7 |
| 6 | 30 | 15 | 400 | 30 | 7000 | 19.8 |

TABLE 3

| EXAMPLE NUMBER | CONCENTRATION OF SCREEN PRINTING SOLUTION (% W/W) | SCREEN TYPE | POLYPHENYLENE COATING THICKNESS (Å) | TILT BIAS ANGLE (DEGREES) |
| --- | --- | --- | --- | --- |
| 8 | 16 | 200S | 700 | 21 |
| 9 | 16 | 200S | 700 | 19.5 |

TABLE 4

| Ex. No. | FURNACE PARAMETERS | | | ALIGNMENT LAYER THICKNESS (Å) | AROMATISATION LEVEL (%) | TILT BIAS ANGLE (DEGREES) | | | |
| --- | --- | --- | --- | --- | --- | --- | --- | --- | --- |
| | R (°C./min) | (T) (°C.) | t (hours:mins) | | | LAYER A | | LAYER B | |
| | | | | | | M1 | M2 | M1 | M2 |
| 13 | 15 | 300 | 0:30 | 2200 | | 1.1 | 1.5 | 1.1 | 1.5 |
| 14 | 15 | 300 | 1:00 | 1600 | 66 | 5.7 | 4.0 | 7.1 | 5.4 |
| 15 | 15 | 300 | 2:00 | 970 | 98 | 20.8 | 17.6 | 18.2 | 12.1 |
| 16 | 15 | 300 | 6:00 | 880 | 99 | 22.6 | 18.8 | 17.8 | 16.5 |
| 17 | 15 | 400 | 0:05 | 730 | 100 | 23.3 | 20.3 | 23.6 | 22.5 |
| 18 | 15 | 250 | 130:00 | 1030 | 95 | 11.7 | 12.2 | 13.1 | 12.3 |

TABLE 5

| EXAMPLE NUMBER | ALIGNMENT LAYER THICKNESS (Å) | SODIUM ION CONCENTRATION IN THE ALIGNMENT LAYER (ppm) | TILT BIAS ANGLE (DEGREES) M1 | M2 |
| --- | --- | --- | --- | --- |
| 19 | 800 | 72 | 18.1 | 20.4 |
| 20 | 800 | 360 | 15.4 | 18.5 |
| 21 | 800 | 570 | 13.0 | 14.2 |
| 22 | 800 | 720 | 13.3 | 12.1 |
| 23 | 800 | 1130 | 8.7 | 9.3 |

TABLE 6

| EXAMPLE NUMBER | FURNACE PARAMETERS R (°C./min) | (T) (°C.) | t (hours:mins) | ALIGNMENT LAYER THICKNESS (Å) | TILT BIAS ANGLES (DEGREES) |
| --- | --- | --- | --- | --- | --- |
| 24 | 15 | 300 | 6:00 | 800 | 21.2 |
| 25 | 15 | 350 | 2:00 | 1400 | 23.4 |
| 26 | 15 | 400 | 0:05 | 1100 | 27.3 |
| 27 | 15 | 260 | 110:00 | 900 | 18.5 |

We claim:

1. A liquid crystal alignment layer supported upon a substrate, said alignment layer consisting essentially of a polyphenylene polymer prepared from a poly(1,2-disubstituted-cyclohexa-3,5-diene) prepolymer by aromatisation thereof to convert at least 98% of the 1,2-disubstituted-cyclohex-4-enylene rings of the prepolymer into phenylene rings.

2. A liquid crystal device comprising an alignment layer as claimed in claim 1.

3. An alignment layer as claimed in claim 1 wherein the poly(1,2-disubstituted-cyclohexa-3,5-diene) prepolymer is a poly(1,2-di(carboxylic ester)-cyclohexa-3,5-diene).

4. An alignment layer as claimed in claim 3 wherein the poly(1,2-di(carboxylic ester)-cyclohexa-3,5-diene) is a poly(1,2-diacetoxy-cyclohexa-3,5-diene).

5. An alignment layer as claimed in claim 3 or claim 4 having a thickness of from 100 Å to 10000 Å.

6. An alignment layer as claimed in claim 1 wherein the poly(1,2-disubstituted-cyclohexa-3,5-diene) prepolymer is a poly(1,2-di(hydrocarbylcarbonate)-cyclohexa-3,5-diene).

7. An alignment layer as claimed in claim 6 wherein the poly(1,2-di(hydrocarbylcarbonate)-cyclohexa-3,5-diene) is a poly(1,2-dimethylcarbonate-cyclohexa-3,5-diene).

8. An alignment layer as claimed in claim 6 or claim 7 having a thickness of from 50 Å to 600 Å.

9. An alignment layer as claimed in claim 1 having a sodium ion concentration of less than 1000 ppm.

10. An alignment layer as claimed in claim 9 having a sodium ion concentration of less than 500 ppm.

11. A method of preparing an alignment layer as claimed in claim 1 which comprises forming the said alignment layer upon a substrate.

12. A method as claimed in claim 11 which comprises the steps of:

(a) depositing a layer of a poly(1,2-disubstituted-cyclohexa-3,5-diene) onto a substrate;

(b) subjecting the poly(1,2-disubstituted-cyclohexa-3,5-diene) layer from (a) to a heat treatment to aromatise the 1,2-disubstituted-cyclohex-4-enylene rings to phenylene rings; and (c) fabricating the layer from (b) to form the alignment layer.

13. A method as claimed in claim 12 wherein the heat treatment is carried out in an inert atmosphere and involves raising the temperature of the poly(1,2-disubstituted-cyclohexa-3,5-diene) polymer layer to a temperature above the glass transition temperature of the polymer and maintaining this temperature for a time sufficient to effect aromatisation.

14. A method as claimed in claim 12 or claim 13 wherein the heat treatment is carried out in an inert atmosphere and involves raising the temperature to a temperature of between 200° C. and 500° C. and maintaining this temperature for a time sufficient to effect aromatisation.

15. A method as claimed in any one of claims 12 to 14 wherein the deposition of the poly(1,2-disubstituted-cyclohexa-3,5-diene) is at a temperature of from 20° C. to 35° C. and a relative humidity of from 30% to 50%.

16. A method as claimed in any one of claims 12 to 15 wherein the poly(1,2-disubstituted-cyclohexa-3,5-diene) is a poly(1,2-di(carboxylic ester)-cyclohexa-3,5-diene).

17. A method as claimed in claim 16 wherein the poly(1,2-di(carboxylic ester)-cyclohexa-3,5-diene) is a poly(1,2-diacetoxy-cyclohexa-3,5-diene).

18. A method as claimed in any one of claims 12 to 15 wherein the poly(1,2-disubstituted-cyclohexa-3,5-diene) is a poly(1,2-di(hydrocarbylcarbonate)-cyclohexa-3,5-diene).

19. A method as claimed in claim 18 wherein the poly(1,2-di(hydrocarbylcarbonate)-cyclohexa-3,5-diene) is a poly(1,2-dimethylcarbonate-cyclohexa-3,5 diene).

* * * * *